Feb. 2, 1960     L. K. LOEHR     2,923,556
TORSION SPRING SUSPENSION FOR TANDEM AXLE VEHICLES
Filed March 27, 1957     2 Sheets-Sheet 1
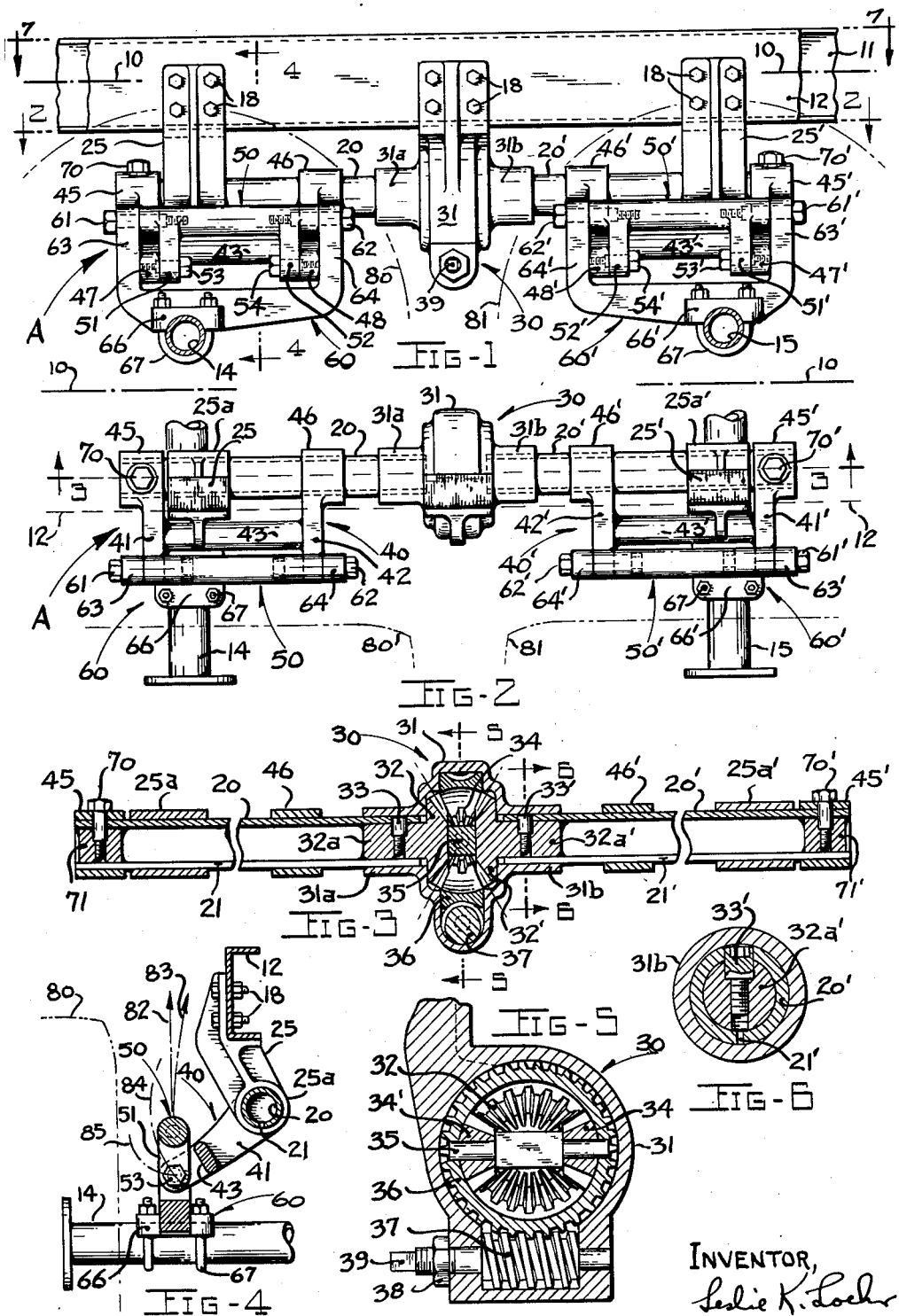
INVENTOR,
Leslie K. Loehr

United States Patent Office 2,923,556
Patented Feb. 2, 1960

2,923,556

TORSION SPRING SUSPENSION FOR TANDEM AXLE VEHICLES

Leslie K. Loehr, Los Angeles, Calif.

Application March 27, 1957, Serial No. 648,810

7 Claims. (Cl. 280—104.5)

This invention relates generally to spring suspension systems for load-carrying wheeled vehicles and particularly to torsion spring suspension systems of this character employed on vehicles having wheel supporting axles arranged in tandem relationship under the load-carrying structure such that loads carried by the axles are distributed equally to the wheels on the ends of the axles.

It is customary in conventional spring suspension systems of the type used on vehicles having dual tandem axles, to employ semielliptical leaf springs for connecting the axles to the vehicle load-carrying structure. In these systems, the ends of the leaf springs are usually connected to the vehicle frame by suitable shackles arranged to permit movement of the springs in vertical planes extending lengthwise of the vehicle. Thus, when the ends of the axles move relative to each other, such as, for example, when one axle end moves up toward the vehicle frame and the other end moves down away from the frame, the springs are subjected to severe twisting forces applied by the axles to the centers of the springs and resisted by the shackles at the ends of the springs. Although a leaf spring is an excellent device for absorbing forces applied in certain directions, the ability to absorb twisting forces of the above-recited nature is not among its faculties, and attempts to attenuate these forces have consisted mainly of inserting rubber bushings in the connections between the shackles and the ends of the springs, and between the springs and the axles.

On trucks having live tandem axles, a type of construction wherein the wheels of both axles are driven, it is common practice to employ a spring suspension system in which two walking beams are connected at their ends to the axles (usually with rubber bushings), and the center of each beam is connected to the center of a leaf spring by means of a rocking pin having its axis arranged in parallel relationship with respect to the axles, while the ends of the spring are connected to the frame by suitable shackles. In this case, the twisting forces are absorbed by the beam and the rubber bushings connecting the beam to the axles. However, since walking beams are employed as an expedient toward maintaining the axles in a generally parallel relationship, under most operating conditions, it follows that the rubber bushings will afford the ability to absorb only a limited amount of relative movement between the ends of the beams and the axle; hence, the allowable transverse tilting movement of the axles with respect to the frame and with respect to each other is also limited.

Another disadvantage characteristic of both the above described suspension systems resides in the fact that the axles are not maintained in parallel vertical planes under all conditions of vertical movement relative to the vehicle frame. For example, where the center of the semielliptic springs are connected to the axles, one end of each spring is shackled to the frame about a fixed axis, thus, as the springs deflect or flatten, the axles swing on radii about such fixed axes, thereby causing the axles to move in longitudinal directions relative to the frame; and where walking beams are used, the axles swing on radii about the axes of the rocking pins, which, in effect, results in similar longitudinal movements of the axles with respect to the vehicle frame.

A further disadvantage of the system having leaf springs directly connected to the axles resides in the condition known as spring windup. In other words, when driving torque or braking forces are applied to the wheels such forces momentarily feed energies to the springs, which energies are quickly returned to the wheels causing clutch and brake chatter. Feedback energy of this character produces a bouncing condition of the wheels and the load-carrying portion of the vehicle, which, when caused by the brakes, is responsible for many accidents due to brake failure on heavy trucks and trailers travelling down grade at relatively high speed. This bouncing condition is cumulative, and once started it can be stopped only by not feeding windup energy into the springs.

The present invention contemplates a spring suspension system for trucks, trailers, and other vehicles having dual tandem axles, which is not only constructed so as to confine the movements of the tandem axles to generally vertical planes extending transversely of the vehicle at substantially right angles to the longitudinal axis thereof under all conditions of spring deflections, but it is further constructed so that loads transmitted by the axles to the wheels are effectively equalized for all positions of the axles in the generally vertical planes, and so that energies resulting from brake and driving forces applied to these wheels are absorbed by the vehicle frame such as to prevent these energies from being fed back to said wheels.

The spring suspension system as above contemplated is made practicable by the use of split-walled tubular spring elements constructed and supported according to the teachings set forth in copending U.S. patent application Serial No. 591,989 filed June 8, 1956. In this invention, a pair of split-walled tubular spring elements is supported along each side of the vehicle frame in end-to-end proximity so that the elements extend lengthwise of the vehicle with their axes lying in a common plane above the axles on one side of the vehicle. The distal ends of each pair of spring elements are coupled to respective axles by suitable shackle means having pivotal axes extending lengthwise of the vehicle and transversely of the axles, which shackle means apply twisting forces to the spring elements according to the loads transmitted to the axles; while the proximal ends of each pair are coupled in force transmitting relationship by equalizing means adapted to effect an equal distribution of the loads between the tandemly disposed wheels on the respective side of the vehicle. Moreover, the present system further contemplates a type of spring suspension wherein the load-carrying capacity of the spring employed may be selectively altered, either manually or automatically, to provide different degrees of spring flexibility for differently loaded conditions of the load-carrying portion of the vehicle or, in other words, to provide adjustability to the springiness of the springs so that an empty vehicle will ride as easily as a vehicle that is loaded. This adjustable feature is also made possible by the split-walled tubular spring elements, and by the adjustable nature of the equalizing means.

Accordingly, it is an object of the present invention to provide a spring suspension system for use in load-carrying wheeled vehicles having dual tandem axles in which movements of the tandem axles relative to the load-carrying structure are confined to generally vertical planes extending transversely of the vehicle, and to provide such a system in which a pair of split tubular members comprise the spring elements connecting the axles to each side of the load-carrying structure.

It is another object to provide such a spring suspension system characterized by ability to equalize weight distribution between wheels mounted on the ends of the tandem axles.

It is a further object to provide such a spring suspension system which is equally well adapted for use with tandemly disposed axle structures having power driven wheels or with tandemly disposed axle structures having wheels that are not power driven, or a combination of both such axle structures arranged in tandem.

It is an additional object of the invention to provide a suspension system of the above character whereby driving forces and/or braking forces applied to the wheels mounted on the ends of the axle structures are transmitted directly to the vehicle load-carrying structure such that deflections of the spring elements of the system by such forces are positively precluded.

It is also an object of the present invention to provide a spring suspension system for connecting dual axles in tandem under the load-carrying portion of a load-carrying wheeled vehicle, which is characterized by adjustability in the springiness of the spring elements employed for changing the spring-borne condition of the load-carrying structure according to the loads being carried thereby; and to further provide such a system wherein the total weight of the load-carrying portion includes a major portion of the weight of said suspension system.

The novel features of this invention, together with further objects and advantages thereof, will be better understood from the following description considered in connection with the accompanying drawings in which an embodiment of the invention is illustrated. It is to be expressly understood, however, that the drawings are for the purpose of illustration and description only, and are not intended as a definition of the limits of the invention.

In the drawings:

Fig. 1 is a side view of a portion of a wheeled vehicle showing dual axles suspended in tandem relationship from the vehicle load-carrying frame by spring suspension structures embodying this invention;

Fig. 2 taken on line 2—2 of Fig. 1, is a plan view representative of the structures employed on both sides of the vehicle portion shown in Fig. 1;

Fig. 3 is a sectional view taken on line 3—3 of Fig. 2;

Fig. 4 taken on line 4—4 of Fig. 1, is a sectional view representative of the structures connecting the dual axles to both sides of the vehicle portion shown in Fig. 1;

Fig. 5 is a sectional view taken on line 5—5 of Fig. 3;

Fig. 6 is a sectional view taken on line 6—6 of Fig. 3;

Figure 7:
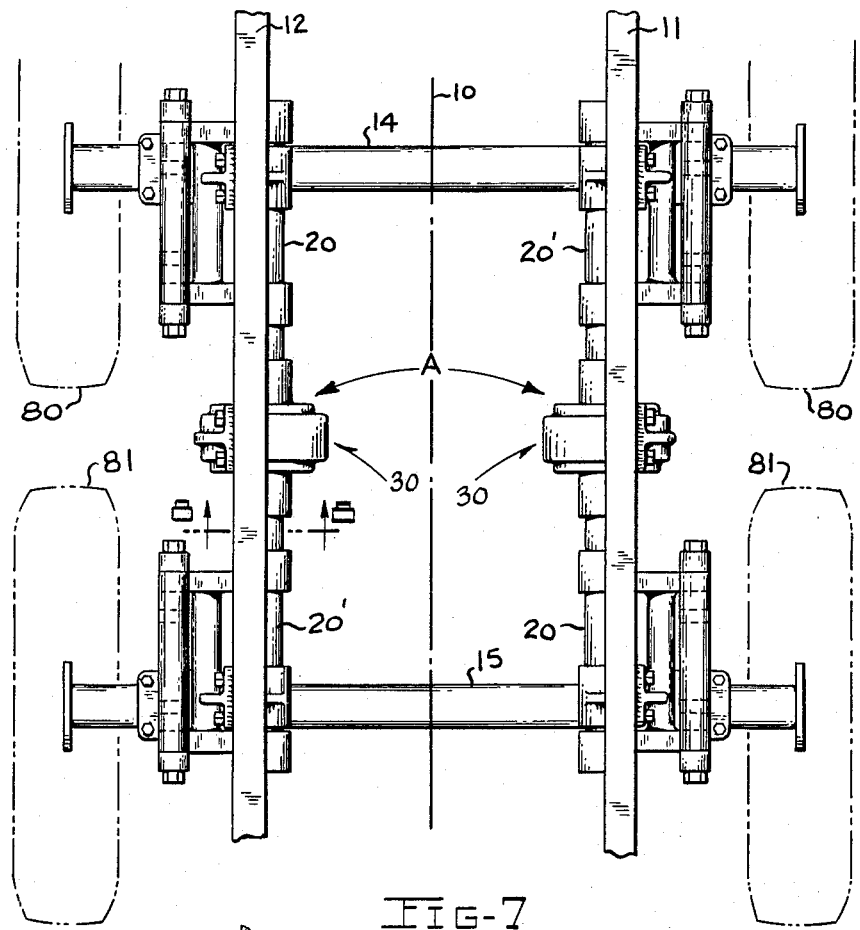

Fig. 7, taken on line 7—7 of Fig. 1, is a plan view showing dual wheel-supporting axles connected to side members of the vehicle frame; and—

Figure 8:
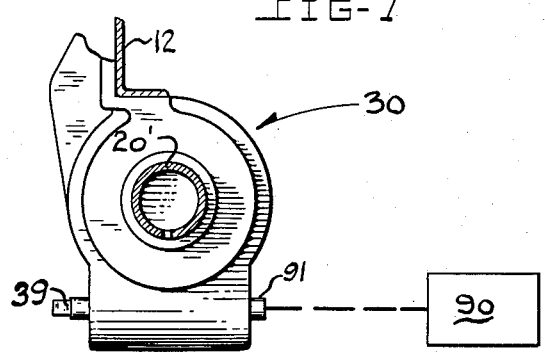

Fig. 8, taken on line 8—8 of Fig. 7, shows the structure of Fig. 5 with modifications.

The wheeled vehicle, of which a portion is shown in Figs. 1 and 7, is so constructed as to include a longitudinal axis 10, a load-carrying frame identified by frame side members 11 and 12, and dual wheel-supporting axles 14 and 15 suspended transversely of the vehicle axis in parallel tandem relationship from the vehicle frame by two identical spring suspension assemblies (one from each side member) such as assembly A seen in Figs. 1 and 2 where a pair of split-walled tubular spring elements 20 and 20' are shown supported in an end-to-end interconnected relationship (see Fig. 3) with their axes in a common plane below the vehicle frame by hanger brackets 25, 25' and an equalizer 30 all connected to frame side member 12 by bolts 18 such that the spring elements extend in opposite directions lengthwise of the vehicle frame and transversely of axles 14 and 15, and where lever arms 40, 40', links 50, 50'; and axle brackets 60, 60' cooperate to connect axles 14 and 15 to the outboard or distal ends of spring elements 20 and 20'. The split-walled characteristics of spring elements 20, 20' are shown in Figs. 3, 4 and 6 where reference numerals 21, 21' indicate gaps or slits in the walls of the tubular elements.

In supporting spring elements 20, 20', as above described and shown in Fig. 1, brackets 25, 25' are provided with portions 25a, 25a' extending downwardly from side member 12, which circumferentially embrace the spring elements near the outboard or distal ends thereof; while a housing 31 of equalizer 30, dependent from frame member 12 is provided with side portions 31a and 31b which likewise circumferentially embrace the spring elements at their inboard or proximal ends, as seen in Fig. 3. Thus, spring elements 20 and 20' are not only supported by the vehicle frame, but the character of this support is such as to allow rotary and/or axial movement of these elements relative to the hanger brackets and the equalizer housing, and such as to provide radial movements of the elements split walls. This is an essential feature of the structure employed for supporting split-walled tubular springs because torsional deflection of such springs is accompanied by helical warping of the wall of the tubular spring, characterized by relative movement in opposite axial direction of the tube wall portions facing each other across the split or gap, such as gap 21, Fig. 4, and by a tendency of such wall portions to move radially particularly at the ends of the spring.

According to the present embodiment, equalizer 30 as seen in Figs. 3 and 5, is a mechanism that not only supports elements 20, 20' in end-to-end proximity, but it also interconnects the ends so held in a force transmitting relationship characterized by the fact that rotary movement of one spring element in one direction causes the other spring element to rotate an equal amount in the other direction. This condition is effected by a gear train comprising bevel gears 32, 32' drivingly connected to the proximal ends of spring elements 20, 20' with pins 33, 33' threadedly engaging hubs 32a, 32a' of the respective gears, and reversing pinions or idler gears 34, 34' mounted on a shaft 35 adjustably supported in housing 31 by a ring gear 36 in driven engagement with a worm 37, as shown in Fig. 5.

Lever arms 40 and 40' seen in Figs. 1, 2, and 4, are rigid structural members having side elements 41, 42 and 41', 42' separated by spreader elements 43, 43' such that each member has in general, an H-shaped configuration. Side elements 41, 42, 41' and 42' are respectively provided with end portions 45, 46, 45' and 46' bored to circumferentially embrace tubular spring elements 20 and 20', and with end portions 47, 48, 47' and 48' pivotally connected to downwardly projecting lugs 51, 52, 51' and 52' of links 50 and 50' by pivot pins 53, 54, 53' and 54' extending through openings in ends 47, 48, 47' and 48' and threadedly received by the lugs, according to Fig. 1. Axles brackets 60 and 60', also according to the view in Fig. 1, are U-shaped members of rigid construction pivotally connected to links 50 and 50' by pivot pins 61, 62, 61' and 62' extending through openings in the upper ends of legs 63, 64, 63' and 64' of the axle brackets into threaded engagements with the links as indicated by dotted lines.

It is to be noted that end portions 45 and 45' of lever arms 40 and 40' not only circumferentially embrace portions of split-walled tubular spring elements 20 and 20', but they are drivenly connected to said portions by suitable shoulder screws 70 and 70', such that helical warping or twisting of the spring elements is accommodated and radical displacement of the embraced portions of the split walls is precluded. As shown, screws 70 and 70' extend through radial openings in end-portions 45, 45' and through radial openings in the distal ends of the spring elements into threaded openings in alignment members 71 and 71', of which the latter operate to maintain screws 70 and 70' in proper radial positions. It is to be further noted that axle brackets 60 and 60' are constructed to include mounting pads 66 and 66' which coact with U-bolts 67 in rigidly connecting these brackets to axles 14 and 15 such that axes of the openings in the upper ends of legs 63, 64, 63' and 64' are disposed at right angles to the axes of the axles. Thus, lever arms 40 and 40', links 50 and 50', and axle brackets 60 and 60' cooperate with the pivot pins to form shackle linkages or articulated couplings connecting the distal ends of spring elements 20 and 20' to axles 14 and 15 such that up and down movements of the axles relative to the vehicle frame produces forces twistingly applied to the distal ends of the spring elements.

An important feature of the present invention resides in the fact that the up and down movements of axles 14 and 15 relative to the vehicle load-carrying frame are confined to vertical planes extending transversely of the frame at right angles to the longitudinal axis 10 of the vehicle. This feature results from the parallel relationships of the functional axes of suspension assembly A with respect to each other and with respect to axis 10 of the vehicle, and from the right angle relationship of these functional axes with respect to the axes of the axles. In other words, the axes of spring elements 20 and 20' and the axes of the pivot pins connecting links 50, 50' between lever arms 40, 40' and axle brackets 60, 60' are not only parallel with respect to each other and the longitudinal axis 10 of the load-carrying frame, but they are disposed at right angles with respect to the axes of axles 14 and 15.

In light of the above description of spring suspension assembly A, and in view of the fact that two of these assemblies are identically employed in a complete suspension system (see Fig. 7), it is now apparent that movements of axles 14 and 15 relative to frame side members 11 and 12, will be confined to vertical planes extending transversely of the vehicle frame at right angles to the longitudinal axis 10 for all possible conditions wherein the weight of the vehicle frame and loads carried thereby are transmitted through the axles to wheels 80 and 81 (schematically represented by dotted lines) supported by the axles according to any of the well-known practices of the prior art. For instance, the cross sectional view of Fig. 4 is representative of the two suspension assemblies A interconnecting axle 14 to frame side members 11 and 12. In this view, let it be assumed that both ends of the axle move equal distances in the same direction relative to the frame, in which case line 82 indicates the path of movement of axle bracket 60. Then, let it be assumed that only one end of the axle moves relative to the frame, in which case line 83 indicates an arcuate path of movement of bracket 60. However, in both cases pivot pins 53 and 54 swing in an arc 84 described by lever arm 40 about the central axis of spring element 20, for which compensation to prevent lateral displacement of the axle with respect to the vehicle frame is provided by a lateral swinging movement of link 50 about pivot pins 61 and 62 in an arcuate path 85. In other words, swinging movement of lever arm 40 about the axis of spring element 20 is accompanied by a swinging movement of link 50 about the axis of pivot pins 61 and 62.

Having described the structural connections between the vehicle frame and axles 14 and 15 the advantageous effects of equalizer 30 will now be described. To fully understand the importance of these effects, it must be remembered that tubular elements 20 and 20' are not only torsionally deflectable, but they are constructed of spring material, such as spring steel; hence, they are also torsionally resilient.

Let it be assumed for purposes of description, that the vehicle load-carrying structure represented by frame side members 11 and 12, and axle 15 are fixed or immovable with respect to each other, and that axle 14 is allowed to move in its respective vertical plane. Now, if forces are applied to wheel 80 such that axle 14 moves upwardly, then axle bracket 60 also moves upwardly as indicated by lines 82 or 83 in Fig. 4, and exerts an upwardly directed force on link 50 which in turn, rotates lever arms 40 about the axis of spring element 20 such that twisting forces are applied to the distal end of the spring element through shoulder screw 70 and end portion 45 of the lever arm side element 41. Looking from the distal end of spring element 20 toward the distal end of spring element 20' along the aligned axes of these elements, the rotational movement of lever arm 40 is in a counterclockwise direction; hence, bevel gear 32 of equalizer 30 is caused to rotate counterclockwise, which rotation is reversed by idler gears 34 and 34' such that bevel gear 32' is caused to rotate clockwise and drive spring element 20' in a clockwise direction. However, since the vehicle frame and axle 15 are immovable with respect to each other, the force system including hanger brackets 25 and equalizer housing 31 is so constituted that clockwise rotation of the distal end of spring element 20' is effectively prevented by a counterclockwise force applied to the spring element 21' distal end by arm 40' through end portion 45' of the lever arm side element 41' and shoulder screw 70'.

In view of the fact that the distal end of spring element 20' is prevented from rotating in response to the rotation of the distal end of spring element 20, it follows that one or both of the spring elements accommodate this situation by deflecting torsionally. Thus, by constructing spring elements 20 and 20' so as to provide the same deflection qualities for the same twisting forces, both elements will deflect equal amounts and in opposite directions in the above described situation, because of equalizer 30 which not only operates to reverse the sense of the twisting forces applied to the proximal ends of spring elements 20 and 20', but it also operates to divide such twisting forces equally between both spring elements regardless of the positions of axles 14 and 15 in their respective vertical planes of movement relative to the vehicle load-carrying frame.

For example, if both axles move the same distance toward the vehicle frame, it follows that equal twisting forces are applied to the distal ends of the spring element in counterclockwise direction, looking from the distal end of element 20 toward the distal end of element 20', along their aligned axes. In this case, gears 32 and 32' connected to the proximal ends of the spring elements attempt to rotate in the same counterclockwise direction, but are prevented from such rotation by idler gears 34 and 34'. In this connection it must be remembered that pin 35, rotatively supporting the idler gears, is supported in equalizer housing 31 by a ring gear 36 in driven engagement with a worm 37; hence, pin 35 is stationary, and any inequality in the forces applied to idler gears 34 and 34' by gears 32 and 32' causes the idler gears to rotate on pin 35 until the forces applied by gears 32, 32' are equalized.

The adjustable feature provided pin 35, with respect to its relative radial position in housing 31, is an important characteristic of this invention because it permits the proximal ends of spring elements 20 and 20' to be rotated with respect to the equalizer housing for increasing or decreasing the torsional stiffness of spring elements 20 and 20' to accommodate differently loaded conditions of the vehicle load-carrying frame. In conventional leaf spring suspension systems, adjustments of the spring stiffness is highly impracticable; thus, in a vehicle having a load-carrying frame weighing 2000 pounds and a leaf spring suspension system adapted for suitable deflection when the total weight of the frame and the load carried thereby is 20,000 pounds, the unloaded frame will cause little, if any, deflection of the leaf springs. If, however, such a vehicle were equipped with the present invention, the equalizer could be easily adjusted to provide effective springiness under both empty and fully loaded conditions of the load-carrying frame.

Examining Fig. 5, it can be seen that worm 37 can be locked to prevent its rotation by a nut 38, and that by loosening this nut, the worm can be rotated by manual means, such as a wrench or crank applied to the squared-end shaft 39 of worm 37 extending outwardly of case 31. Another means of changing the statically deflected conditions of spring elements 20 and 20' comprises a power driven mechanism 90 schematically indicated in Fig. 8, which is drivingly connected to worm 37 through an extension 91 of worm drive shaft 39. Mechanism 90 may be selectively controlled by manually operable devices or it may be automatically controlled by devices responsive to prolonged changes in the relative positions of the axles with respect to the load-carrying frame. In either case, where mechanism 90 is employed, nut 38 would be omitted.

Although it is an object of the present invention to provide spring suspension systems equally well adapted for use in vehicles having driving and/or non-driving wheels equipped with suitable braking mechanisms, the structural details for connecting such wheels to the axles, as well as the brake mechanisms, have been omitted, because structures of this character are wellknown in the art; therefore, it is to be understood that axles 14 and 15, and wheels 80 and 81 are representative of driving axles and wheels, non-driving axles and wheels, and a combination of driving and non-driving axles and wheels, and it is to be further understood that all such axles and wheels may be equipped with suitable braking mechanisms according to requirements.

Examining Figs. 1 and 4, it will be seen that, in addition to the torsional loadings, tubular spring elements 20 and 20' are subjected to transverse loadings resulting from the force system whereby the weight of the load-carrying structure is transmitted to the axles. Stated differently, equalizer housing side portions 31a and 31b, and hanger brackets 25 and 25' transmit the weight of the vehicle frame to spring elements 20 and 20' such that the forces resulting from the weight are at right angles to the spring element axes. Now, these weight forces are resisted by counteracting forces originated by the wheels and applied to spring elements 20 and 20' by end portions 45, 46, 45' and 46' of lever arms 40 and 40' at different axial locations along the spring elements spaced from housing side portions 31a, 31b and brackets 25, 25'; hence, the spring elements act as members subjected to bending loads in addition to torsional loads, of which the latter result from actions of lever arms 40 and 40' in transferring the weight of the vehicle load-carrying structure to axles 14 and 15 through links 50, 50' and axle brackets 60 and 60'.

In brake mechanisms employed on wheeled vehicles, non-rotating structures are rigidly mounted on the wheel-supporting axles, and are adapted for frictional engagement with rotating structures mounted on the wheels; thus, when the brakes are actuated, frictional forces between the rotating and non-rotating structures produce forces tending to rotate the non-rotating structure which, in turn, applies twisting forces to the axles. In the present invention, these axle twisting forces are effectively transmitted to the load-carrying frame where they are completely absorbed with no tendency to cause torsional deflection of the tubular spring elements. This is an important feature resulting from the fact that the direction of spring element deflections is, in effect, at right angles to the direction of the twisting forces applied to the axles. Moreover, this ability to transmit brake reaction forces directly to the frame is also effective to transmit driving reaction torque directly to the frame; thus, when a vehicle having driving wheels changes from a standstill condition to one of wheel-driven motion, counter driving torque is transmitted directly to the load-carrying frame without causing spring deflections. Since spring deflections are prevented under the conditions above described, energy is not stored in the springs, consequently no energy is fed back to the wheels; hence, brake and clutch chatter caused by feedback energy is precluded.

Another advantage of the spring suspension system herein disclosed, resides in the fact that much of the weight of this system is added to the weight of the load-carrying structure; therefore it becomes sprung weight, or weight that is actually effecting torsional deflection of the split-walled tubular springs.

What is claimed as new is:

1. In a vehicle having a load-carrying frame and a pair of transversely-extending tandemly-disposed axles with load-supporting wheels journaled on the ends of said axles, a pair of spring assemblies interconnecting the vehicle frame and the axles such that said frame is resiliently supported on said axles, each of said pair of spring assemblies comprising: a pair of tube-like torsion spring members having longitudinal axes and generally cylindrical walls with axially disposed slots extending the full lengths of said walls whereby said walls are provided with helicoidal warping abilities characterized by tendencies of the slot-forming wall portions to move radially at the ends of said spring members when twisting forces are twistingly applied to said members; first means coupling the pair of spring members in force-transmitting axially-aligned end-to-end relationship such that twisting one of the pair of members about its axis in either direction effects twisting of the other member in the opposite direction, said first means circumferentially embracing the cylindrical walls of the proximate ends of the pair of spring members such that the helicoidal warping abilities of said cylindrical walls are accommodated, and such that radial movements from the radial-movement tendencies of the slot-forming wall portions are precluded; load-transmitting linkages connecting the tube-like spring members to respective portions of the transversely-extending tandem axles, said linkages including elements circumferentially embracing the cylindrical walls of the distal ends of said spring members and spring-member-twisting connections between said elements and said embraced-wall portions, said embracements and spring-twisting connections being of a character to accommodate the helicoidal warping abilities of said cylindrical walls and preclude movement from the radial-movement tendencies of the slot-forming wall portions at the distal ends of the spring members; and second means connecting the pair of tube-like spring members to one side of the load-carrying frame in transvere relationship with respect to the tandem axles, said second means being constructed and arranged to cooperate with the first means and the load-transmitting linkages such that weight of the vehicle frame is transmitted to said axles as forces twistingly applied to said spring members.

2. In a vehicle having a load-carrying frame and a pair of transversely-extending tandemly-disposed axles with load-supporting wheels journaled on the ends of said axles, a pair of spring assemblies interconnecting the vehicle frame and the axles such that said frame is resiliently supported on said axles, each of said spring assemblies comprising: a pair of tube-like torsion spring members having longitudinal axes and generally cylindrical walls with axially disposed slots extending the full lengths of said walls for providing said spring members with abilities to twist throughout their lengths in response to forces twistingly applied thereto, said twisting abilities being characterized by relative movements between the slot-forming wall portions when said spring members are twisted; first means coupling the tube-like spring members in force-transmitting axially-aligned end-to-end relationship such that twisting one member in either direction effects an oppositely twisted condition of the other member, and such that characterizing twisting abilities of said spring members are accommodated; load-transmitting linkages connecting the tube-like spring members to respective portions of the transversely extending tandem axles, said linkages including elements circumferentially embracing portions of the cylindrical walls of said spring members, and spring-member-twisting connections between said elements and said embraced-wall portions, said embracements and spring-twisting connections being such that the characterizing twisting abilities of said spring members are accommodated; and second means connecting the tube-like spring members to one side of the load-carrying frame in crosswise relationship with respect to the tandem axles, said second means being so constructed and arranged that weight of said load-carrying frame is transversely carried by said spring members and is transmitted to said axles as forces twistingly applied to said spring members through cooperative action of the first means and the load-transmitting linkages.

3. In a vehicle having a load-carrying frame and a pair of tandemly disposed axles with load-supporting wheels journaled on the ends of said axles, a pair of spring assemblies interconnecting the vehicle frame and the axles such that said frame is resiliently supported on said axles, each of said spring assemblies comprising: a torsion spring including a pair of tube-like members having longitudinal axes and generally cylindrical walls with axially disposed slots extending the full lengths of said walls for providing said tube-like members with abilities to twist throughout their lengths in response to forces twistingly applied thereto, said twisting abilities being characterized by relative movements between the slot-forming wall portions when said tube-like members are twisted, and including a force-reversing mechanism coupling the pair of tube-like members in force-transmitting axially-aligned end-to-end relationship so as to accommodate the twisting abilities of said members, and such that a force twistingly applied to one tube-like member in one direction is twistingly applied to the other tube-like member in an opposite direction; load-transmitting linkages connecting the torsion spring to respective portions of tandemly disposed axles, said linkages including elements circumferentially embracing portions of the cylindrical walls of the pair of tube-like members, and member-twisting connections between said elements and said embraced-wall portions, said embracements and said member-twisting connections being such as to accommodate the characterizing twisting abilities of said tube-like members; and support means connecting the torsion spring to one side of the load-carrying frame in crosswise relationship to the tandemly disposed axles, said support means including brackets circumferentially embracing portions of the cylindrical walls of the torsion spring tube-like members such that said one side of the load-carrying frame is supported by said tube-like members from said axles through the load-transmitting linkages, and such that forces resulting from this supporting action are directly applied to said members cylindrical walls transversely of the members axes and converted to torsion-spring-twisting forces twistingly applied to the pair of tube-like members by the load-transmitting linkages and the force-reversing mechanism of the torsion spring.

4. The combination defined in claim 3 in which one of said linkages is characterized by a pair of spaced-apart elements with end portions rotatably receiving the cylindrical wall of a tube-like member, and by the fact that one of said end portions is drivingly connected to said wall so as to constitute a member-twisting connection for said one linkage.

5. The combination defined in claim 3 wherein the force-reversing mechanism is mounted on said one side of the load-carrying frame such as to cooperate with said brackets to constitute the support means.

6. The combination defined in claim 5 wherein the force-reversing mechanism included means drivingly coupled to the proximate ends of the tube-like elements, said means being rotatable relative to the vehicle frame such that changes can be effected in the torsional stiffness of the torsion spring.

7. In a vehicle having a load-carrying frame and a pair of transversely-extending tandemly-disposed axles with load-supporting wheels journaled on the ends of said axles, a pair of spring assemblies interconnecting the vehicle frame and the axles such that said frame is resiliently supported on said axles, each of said spring assemblies comprising; a pair of tube-like torsion spring members, each of said spring members having a longitudinal axis and a generally cylindrical wall with an axially disposed slot extending the full length of said wall for providing said spring member with ability to twist throughout its length in response to forces twistingly applied thereto, said twisting ability being characterized by relative movements between the slot-forming wall portions when said spring member is twisted; a force-reversing mechanism coupling the pair of tube-like spring members in force-transmitting axially-aligned end-to-end relationship so as to accommodate the twisting ability of each spring member, and such that a force twistingly applied to one spring member in one direction is twistingly applied to the other spring member in an opposite direction; a pair of load-transmitting linkages connecting the pair of tube-like spring members to respective portions of the pair of tandemly disposed axles, each of said linkages including an element circumferentially embracing a portion of the wall of one of said pair of spring members, and a spring-member-twisting connection between said element and embraced-wall portion, said embracement and said spring-twisting connection being such as to accommodate the characterizing twisting ability of said spring member; and support means connecting the pair of tube-like spring members to one side of the load-carrying frame in crosswise relationship to the tandemly disposed axles, said support means including a pair of brackets so constructed that each bracket circumferentially surrounds a portion of the wall of a respective spring member, and so arranged with respect to the load-carrying frame that the one side of said frame is supported by the pair of spring members from the pair of axles through the pair of linkages, said supporting action being such that forces resulting therefrom are directly applied to the walls of the pair of spring members transversely of their axes and are converted to member-twisting forces twistingly applied to said pair of spring members by cooperative action of the force-reversing mechanism and said pair of load-transmitting linkages.

References Cited in the file of this patent

UNITED STATES PATENTS

| | | |
|---|---|---|
| 2,435,199 | Buckendale | Feb. 3, 1948 |
| 2,469,566 | Low | May 10, 1949 |

FOREIGN PATENTS

| | | |
|---|---|---|
| 872,258 | France | June 3, 1942 |